2,969,386
PRODUCTION OF POLYURETHANE-POLYISOCYANATES

Wilbur R. McElroy, New Martinsville, W. Va., assignor to Mobay Chemical Company, St. Louis, Mo., a corporation of Delaware No Drawing. Filed Apr. 29, 1957, Ser. No. 655,518

2 Claims. (Cl. 260—471)

This invention relates to a process for the production of organic polyisocyanates. More particularly, the invention is concerned with a process for the production of urethane polyisocyanates from low molecular organic dissocyanates.

It is well known that organic dissocyanates, such as hexane-1,6-diisocyanate, cylohexane-1,4-diisocyanate, the toluylene diisocyanates, the phenylene diisocyanates, p,p'-diphenylmethane diisocyanate and 1,5-naphthylene diisocyanate, are valuable starting materials for the production of polyurethane plastics. Such diisocyanates are comparatively easily prepared by phosgenation of the corresponding diamines. However, when handling diisocyanates, precautions must be taken since isocyanate vapors irritate the skin, the eyes and the respiratory tract and when inhaled cause damage to the mucous membranes. Therefore, attempts have been made to convert the low molecular volatile organic diisocyanates into nonvolatile higher molecular polyisocyanates which do not have the above toxic effects. This is commonly done by reacting polyhydric alcohols with excess diisocyanate whereby urethane polyisocyanates are formed (see, for example, German Patents 756,058 and 870,400). Taking ethylene glycol and toluylene-2,4-diisocyanate as illustrative examples, the formation of urethane polyisocyanates from polyhydric alcohols and low molecular organic diisocyanates may be represented by the following equation.

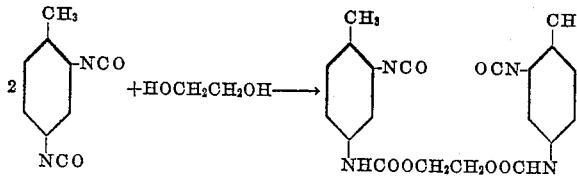

In carrying out the production of urethane polyisocyanates, the diisocyanate component is used in such an excess as to provide at least one mol of diisocyanate per mol equivalent of hydroxyl group contained in the polyhydric alcohol in order to obtain products of the above-represented type. However, even when employing an excess of diisocyanate, there are also formed along with urethane polyisocyanates of the above type reaction products of higher molecular weight, for example, 3 mols of diisocyanate with 2 mols of polyhydric alcohol or 4 mols of dissocyanate with 3 mols of polyhydric alcohol et cetera, such as

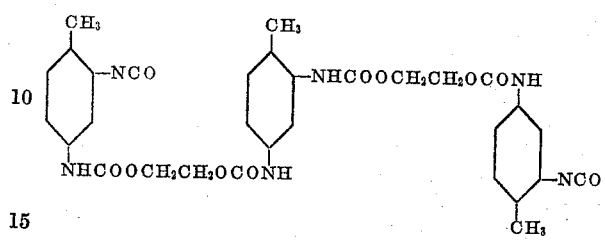

and

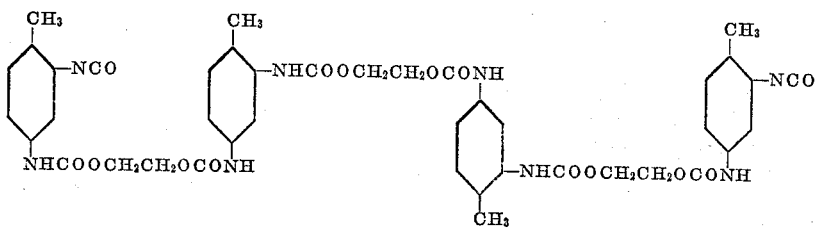

As a result of these side reactions leading to the formation of polymeric products, it has heretofore been impossible to produce urethane polyisocyanates which are free of unreacted diisocyanate: if the polyhydric alcohol is reacted with the stoichiometric amount of diisocyanate, a certain proportion of the dissocyanate remains unchanged in the reaction mixture in view of the formation of the above polymers; if the diisocyanate component is used in an excess, i.e, in an amount larger than 2 mols of diisocyanate per hydroxyl group contained in the polyhydric alcohol, in order to avoid the formation of the above polymers and to shift the reaction towards the formation of the desired urethane polyisocyanates, the urethane polyisocyanates obtained contain at least the excess of diisocyanate used in the reaction.

In view of the fact that the urethane polyisocyanates have a lower molecular weight than the polymers resulting from side reactions, they contain more available NCO per unit of weight than the latter. Thus, the above reaction product from one mol of ethylene glycol and 2 mols of toluylene diisocyanate contains 20.5% of available NCO while the polymer from 3 mols of ethylene glycol and 4 mols of toluylene diisocyanate contains only 10.5% of available NCO. As a practical matter, the production of nonvolatile urethane polyisocyanates from volatile low molecular diisocyanates is carried out for the purpose of obtaining compounds which although no longer toxic contain a sufficient amount of available NCO groups to be suitable for use as starting materials in the manufacture of polyurethane coatings, lacquers, impregnations and similar products. For this reason, the formation of the above polymers, which amounts to a loss of available NCO groups per unit of weight, is undesirable and a stoichiometric excess of diisocyanate as high as 50% to 200% is used in the production of the commercially employed urethane polyisocyanates.

The urethane polyisocyanates thus obtained contain the desired amount of available NCO but are objectionable from the standpoint of toxicity in view of the high proportion of free monomeric diisocyanate contained in these products. It has, therefore, been proposed to free the technically obtained urethane polyisocyanates from their free monomeric diisocyanate content by distillation. However, in conventional distillation processes polymerization reactions of the urethane polyisocyanates lead to the formation of insoluble high molecular products which clog the distillation equipment and thus create serious operational difficulties. Moreover, the heretofore disclosed distillation processes do not result in a product which is substantially free of the toxic diisocyanate reactant.

It is, therefore, a primary object of this invention to provide a process for the production of urethane polyisocyanates which are substantially devoid of unreacted diisocyanate and contain only a controlled and limited amount of side reaction products of high molecular weight. Another object of the invention is to provide a method for making urethane polyisocyanates, the composition of which fairly closely corresponds to a reaction of one mol of polyhydric alcohol with a number of mols of diisocyanate equal to the number of hydroxyl groups contained in the polyhydric alcohol. A further object of the invention is to provide a method for making urethane polyisocyanates having nearly the theoretically possible percentage of available NCO groups and containing only a negligible amount of low vapor pressure toxic diisocyanate. A further object of the invention is to provide a method for making urethane polyisocyanates of the above characteristics which can be carried out in a simple and economical manner. A further object of the invention is to provide a method for making urethane polyisocyanates which does not create any operational difficulties due to the formation of high molecular weight isoluble products. A still further object of the invention is to provide a method for making urethane polyisocyanates which are eminently suitable for use in the manufacture of coatings, lacquers, impregnations and the like. Still further objects will appear hereinafter.

In accordance with this invention, generally speaking, the foregoing objects and others are accomplished by providing a method for the production of urethane polyisocyanates which comprises reacting a polyhydric alcohol with an organic diisocyanate in an amount in excess over that required for a reaction of one mol of diisocyanate with each hydroxyl group contained in the polyhydric alcohol, extracting the reaction mixture with an aliphatic and/or alicyclic hydrocarbon at a temperature above the melting point of said reaction mixture but low enough to avoid undesirable polymerization reactions, separating the solvent layer from the liquid product layer obtained in the extraction step and recovering a urethane polyisocyanate from the product layer. The invention is based on the discovery that aliphatic and alicyclic hydrocarbons are capable of extracting even large amounts of organic diisocyanates from urethane polyisocyanates without a substantial loss of urethane polyisocyanate by partial solution in the solvent layer.

In the first step of the process of the invention, a polyhydric alcohol is admixed with an organic dissocyanate in an amount in excess over that required for a reaction of one mol of diisocyanate per mol equivalent of hydroxyl group contained in the polyhydric alcohol. Thus, if the polyhydric alcohol is a glycol, such as ethylene glycol, at least two mols of diisocyanate are provided for one mol of polyhydric alcohol. In the case of trihydric alcohols, such as glycerol, at least three mols of diisocyanate are employed per mol of alcoholic component. Although the excess of diisocyanate to be utilized can vary within wide limits, a stoichiometric excess of 50% to 200% over the theoretical amount (one mol of diisocyanate per hydroxyl group) has proven to be particularly suitable. To carry out the first reaction step, the components can be brought together in any desired way but it is preferred to add the polyhydric alcohol to the polyisocyanate in order to provide an excess of diisocyanate at all times of the reaction. In a specific embodiment of the first reaction step, the diisocyanate is placed in a mixer and the polyhydric alcohol is added slowly to the diisocyanate while stirring. Since the formation of urethane polyisocyanates is an exothermic reaction and, on the other hand, temperatures above 100° C. lead to the formation of undesired polymerization products, the polyhydric alcohol is preferably added to the diisocyanate at such a rate as to keep the temperature below 100° C. At temperature below 20° C., the reaction becomes unreasonably slow so that in most cases a reaction temperature ranging from about 25° to about 95° C. is preferred. The heat of reaction is advantageously abstracted from the reaction zone by external cooling and the more efficiently cooling can be effected, the more rapidly the polyhydric alcohol can be added.

Any suitable polyhydric alcohol and any suitable polyisocyanate may be used as starting materials for the process of the invention. Among the most commonly employed polyhydric alcohols are ethylene glycol, 1,3-butylene glycol, 1,4-butylene glycol, hexane-1,6-diol, methylhexanediol, diethylene glycol, glycerol, trimethylol ethane, trimethylol propane, 1,2,4-trihydroxy butane, pentaerythritol, triethanolamine, neopentyl glycol and castor oil. Illustrative examples of organic diisocyanates include, inter alia, hexane-1,6-diisocyanate, cyclohexane-1,4-diisocyanate, the toluylene diisocyanates, such as toluylene 2,4- and 2,6-diisocyanate, the phenylene diisocyanates, p,p'-diphenylmethane diisocyanate and 1,5-naphthylene diisocyanate.

Rather than employing one polyhydric alcohol in the process of the invention, mixtures of two or more different polyhydric alcohols may be used in order to obtain urethane polyisocyanates of particular properties. It is also possible to use along with the polyhydric alcohol a small amount, say up to 10% by weight, based on the weight of the polyhydric alcohol, of a higher molecular polyhydroxy compound, such as hydroxyl polyesters obtained by thermal esterification of polybasic organic acids with polyhydric alcohols or hydroxyl polyethers obtained by etherification of glycols, polymerization of alkylene oxides or oxalkylation of polyhydric alcohols.

In the second step of the process of the invention, the reaction mixture is extracted with an aliphatic or alicyclic hydrocarbon or a mixture thereof. The extraction temperature must be above the melting point of said reaction mixture but low enough to avoid undesired polymerization reactions. Depending upon the nature and ratio of the components, i.e., organic diisocyanate and polyhydric alcohol and the nature and solubility of the solvent in the product phase, the melting point of the product layer will vary, but in most cases temperatures above 50° C. will be required to maintain the reaction mixture in a liquid condition. On the other hand, at temperatures above 130° C., the mixture tends to form polymerization products. These polymerization products are undesirable since they have a low available NCO content and cause reduced solubility in polar solvents making the product less desirable for application in coatings, lacquers, impregnations and the like. In most cases, the extraction temperature will therefore range from about 50° to about 130° C.

The selection of the aliphatic and/or alicyclic hydrocarbon to be used in the extraction step is determined by the extraction temperature, it being particularly convenient to employ a solvent which is liquid at the temperature of operation. Aliphatic and alicyclic hydrocarbons boiling between about 50° and about 200° C. at atmospheric pressure, such as the hexanes, cyclohexane, the alkyl cyclohexanes, the heptanes and the octanes, are therefore preferred extraction media. However, is is also possible to use lower boiling aliphatic or alicyclic hydrocarbons, such as the pentanes, or normally gaseous aliphatic hydrocarbons, such as propane and the butanes, if the extraction process is carried out under elevated pressure. Aliphatic and alicyclic hydrocarbons boiling at temperatures close to the boiling point of the organic diisocyanate to be extracted from the reaction mixture are less suitable because they cannot be separated from the diisocyanate extracted by a simple distillation process. On the other hand, aliphatic and alicyclic hydrocarbons boiling well above the boiling point of the diisocyanate to be extracted, but being still liquid at the extraction temperature, may be used to good advantage.

In place of individual aliphatic and alicyclic hydrocarbons, there may also be used naturally occuring hydrocarbon mixtures, such as gasoline fractions or synthetic hydrocarbon fractions of an appropriate boiling point range. Although the main proportion of such hydrocarbon mixtures shall be of aliphatic or alicyclic nature, hydrocarbon mixtures containing up to about 20% of aromatic hydrocarbons are also suitable for use in the practice of the invention. A hydrocarbon mixture which can advantageously be utilized is the so-called Stoddard solvent which is widely used in the dry cleaning industry and sold by the Ashland Oil and Refining Company.

In carrying out the extraction step, the hydrocarbon solvent is contacted with the liquid reaction mixture in any suitable manner. The extraction can be effected batchwise by stirring thes reaction mixture with a suitable amount of the solvent in a heated mixer and thereafter allowing the mixture to separate into two layers. After removing the solvent layer, the extraction is generally repeated with a second, third and so on portion of the solvent until the reaction mixture is substantially free from diisocyanate.

Alternatively, the extraction can be performed continuously by countercurrently contacting the reaction mixture to be extracted with the hydrocarbon solvent in an extraction column. In this embodiment of the extraction step, good results can be obtained if the reaction mixture is continuously fed to the upper part of the extraction column while the solvent is continuously introduced into the lower part thereof. At the same time, the extract formed is continuously removed at the top of the column while the extracted reaction product is discharged at the bottom. During the extraction process, the column is heated electrically or by means of a heat exchanging medium, such as steam.

As already indicated above, during the extraction the melting point of the reaction mixture depends upon the nature and ratio of the components and the nature and solubility of the solvent in the reaction mixture. If the diisocyanate component is used in an excess, the excess will act as a solvent for the reaction product and will contribute to lowering the melting point of the product phase. When subjecting such a mixture to the extraction process, it is frequently necessary to raise the temperature during the extraction in order to keep the mixture liquid since the melting point of the product phase will rise with the removal of the diisocyanate component. Thus a urethane polyisocyanate solution obtained by reacting a mixture consisting of 70% by weight of trimethylol propane and 30% by weight of 1,3-butylene glycol with a 50 mol percent excess of a mixture consisting of 80% of toluylene 1,2,4-diisocyanate and 20% of toluylene 1,2,6-diisocyanate may contain about 30% of free toluylene diisocyanate. If such a reaction product is repeatedly extracted with Stoddard solvent until most of the free toluylene diisocyanate has been removed, a temperature as low as 60° C. will usually be high enough at the beginning of the extraction to keep the product liquid but as the extraction is continued with further portions of solvent, the extraction temperature will gradually have to be raised to about 120° C. at the end of the extraction where the toluylene diisocyanate content of the product goes down to less than 1%.

As a result of the extraction step, there are obtained a solvent layer containing the extracted diisocyanate along with a small amount of the product, and a product layer containing a small amount of the solvent and some residual diisocyanate. Both layers are preferably worked up by distillation whereby the solvent layer is separated into solvent and diisocyanate component and the product layer is freed from the small amount of solvent contained therein. The product thus obtained mainly consists of the desired urethane polyisocyanate along with a certain proportion of higher molecular polymerization products. While the composition of the product may vary depending upon the conditions of operation, the amount of higher molecular polymerization products will always be comparatively small since the process of the invention does not use temperatures above 130° C., which favor polymerization reactions.

The amount of residual free diisocyanate contained in the reaction product will depend upon the efficiency of the extraction step, but it is generally possible to reduce the free isocyanate content of the product to values below 1% without using excessive amounts of time and solvent in this operation. Urethane polyisocyanates containing less than 1% of free diisocyanate are physiologically harmless since their vapor pressure is negligible. Such products do not have any irritating effect on skin, eyes or the respiratory tract and can be handled without taking particular precautions.

The process of the invention makes it possible to convert low vapor pressure toxic diisocyanates into nontoxic urethane polyisocyanates which in many applications can be used in place of the former. Furthermore, the process of the invention permits to obtain tri- and higher functional isocyanates from diisocyanates if the latter are reacted with tri- or higher functional alcohols. Such tri- and higher functional isocyanates are in many applications superior to diisocyanates as far as the properties of the polyurethane products obtained therefrom are concerned.

The urethane polyisocyanates obtained by the process of the invention are eminently suitable for use in the formulation of polyurethane coatings, lacquers, impregnations and the like. In these formulations, they perform like the heretofore known urethane polyisocyanates but offer the advantage of being nontoxic and having a higher content of available NCO.

The following examples illustrate methods of carrying out the present invention but it is to be understood that these examples are given by way of illustration and not of limitation.

EXAMPLE 1

In a vessel equipped for heating, cooling and agitation was placed 645 parts by weight of toluylene diisocyanate, consisting of isomers in the ratio of 65 parts 1,2,4-toluylene diisocyanate to 35 parts 1,2,6-toluylene diisocyanate, and heated to 80° C. To this was added 55.4 parts by weight of a polyol mixture consisting of 16.2 parts 1,3-butylene glycol, 38.2 parts trimethylol propane and one part of a polyester containing 4.98% OH groups. The addition was made over a period of two hours, and the temperature was kept at 79–81° C. during the period of addition of polyol to diisocyanate. The resulting product urethane polyisocyanate dissolved in the excess toluylene diisocyanate was a light yellow viscous liquid when it cooled to room temperature.

A portion of said product was batch extracted with Stoddard solvent purchased from Ashland Oil and Refining Company in the following manner. In a vessel equipped for heating and agitation was placed 381 parts of said product and 210 parts of Stoddard solvent. The temperature of the mixture was raised while agitating until complete fluidity of the product phase was attained and intimate contact of the product phase with the solvent phase was achieved. This temperature was 70° C. After mixing for 5 minutes at the temperature required for complete fluidity of the system the two layers were allowed to separate, and the solvent layer removed. The product layer was again treated in the same manner a total of eight successive times, with the exception that at each successive treatment it was necessary to raise the temperature about 1.5 to 2° C. to maintain the porduct phase in a completely fluid condition to attain intimate contact with the solvent phase. The temperature of extraction at the eighth treatment was 92° C. The solvent extracts were combined and distilled to recover toluylene diisocyanate which was later used in another batch of urethane polyisocyanate. The extracted urethane polyisocyanate was then substantially freed of solvent by distilling out the solvent at 2 mm. pressure and 90° C. The resulting urethane polyisocyanate contained 0.98% free unreacted toluylene diisocyanate and was a light amber solid completely soluble in ethyl acetate. It contained 18.5% available NCO.

EXAMPLE 2

In a vessel equipped for heating, cooling and agitation was placed 58.2 parts by weight of toluylene diisocyanate, consisting of isomers in the ratio of 65 parts 1,2,4-toluylene diisocyanate to 35 parts of 1,2,6-toluylene diisocyanate, and heated to 90° C. To this was added 10 parts by weight of a polyol mixture consisting of 7 parts trimethylol propane and 3 parts 1,3-butylene glycol. The addition was made over a period of about two and one-half hours, and the temperature was kept at about 88 to 100° C. during the period of addition of polyol to diisocyanate. The resulting product urethane polyisocyanate dissolved in the excess toluylene diisocyanate was a light yellow viscous liquid when it cooled to room temperature.

A portion of said product was then batch extracted with Stoddard solvent purchased from Ashland Oil and Refining Company in the following manner. In a vessel equipped for heating and agitation was placed one part of said product and approximately an equal part of Stoddard solvent. The temperature of the mixture was raised to 90° C. while agitating. This produced complete fluidity of the product phase, and intimate contact of the product phase with the solvent phase was achieved. After mixing for 5 minutes at 90° C. the two layers were allowed to separate, and the solvent layer removed. The product layer was again treated in the same manner a total of six successive times, with the exception that at the third, fourth and fifth contacts with fresh solvent it was necessary to raise the temperature to about 100° C. and at the sixth contact to 128° C. to maintain complete fluidity in the product phase. The solvent extracts were combined and distilled to recover toluylene diisocyanate which was later used in another batch of urethane polyisocyanate. The resulting extracted urethane polyisocyanate contained 8.8% Stoddard solvent. In this condition, it was a milky white solid at room temperature. When the solvent was removed by vacuum distillation a light amber solid was obtained which was completely soluble in ethyl acetate. This solid urethane polyisocyanate contained 0.7% free toluylene diisocyanate and 13.6% available NCO.

EXAMPLE 3

Urethane polyisocyanate dissolved in excess toluylene diisocyanate prepared as described in the first part of Example 2 was extracted continuously and countercurrently as follows. An externally heated vertical column divided into seven sections, each section agitated by a turbine on a common shaft extending through the column from the top, was used as the extraction apparatus. Said urethane polyisocyanate containing excess toluylene diisocyanate was fed to the top of the column at the rate of about 12.8 parts by weight per minute and Stoddard solvent purchased from Ashland Oil and Refining Company was fed to the bottom of the column at the rate of about 9 parts by weight per minute while the temperature of the column was held in the range of 100 to 116° C. Solvent extract was continuously removed from the top of the column and extracted urethane polyisocyanate product was removed from the bottom of the column. Said extracted product contained about 7% Stoddard solvent and was a white milky solid at room temperature. When the solvent was removed by vacuum distillation, a light amber solid urethane polyisocyanate containing 0.1% free toluylene diisocyanate and 18.5% available NCO was obtained. This material was completely soluble in ethyl acetate.

*Addendum*

The following analysis shows the composition of the Stoddard solvent referred to hereinabove.

Distillation:
| | |
|---|---|
| IBP | 315° F.±5°. |
| 20% | 330° F.±5°. |
| 50% | 340° F.±5°. |
| 80% | 360° F.±5°. |
| E. P. | 390° F. max. |
| Flash point | 100° F. min. |
| Kauri-butanol value | 38 min. |
| Color, Saybolt | 30. |
| Sulfur H₂S/Doctor | Sweet. |
| Acidity | Neutral. |
| Paraffins and naphthenes | 87.7%. |
| Olefins | 0.8%. |
| Aromatics | 11.5%. |

Although the invention has been described in detail in the foregoing for the purpose of illustration, it is to be understood that such detail is solely for this purpose and that variations can be made by those skilled in the art in the foregoing embodiments without departing from the spirit and scope of the invention except as set forth in the claims.

What is claimed is:

1. A process for the production of urethane diisocyanates which comprises admixing at a temperature less than 100° C. a saturated aliphatic polyhydric alcohol having from two to four hydroxyl groups with an organic diisocyanate selected from the group consisting of saturated aliphatic diisocyanates, saturated cycloaliphatic diisocyanates, and arylene diisocyanates in an amount in excess of that required for the reaction of one mol of said diisocyanate with each mol equivalent of an hydroxyl group contained in said polyhydric alcohol, extracting the reaction mixture with a member having a boiling point of less than 200° C. and selected from the group consisting of aliphatic hydrocarbons, alicyclic hydrocarbons and mixtures thereof at a temperature above the melting point of said reaction mixture, but low enough to avoid undesirable polymerization reactions, separating the solvent layer from the liquid product layer obtained in the extraction step and recovering a urethane polyisocyanate from said product layer.

2. A process for the production of urethane polyisocyanates which comprises admixing at a temperature less than 100° C. a mixture of butylene glycol and trimethylol propane with toluylene diisocyanate in an amount in excess of that required for the reaction of one mol of diisocyanate with each mol equivalent of an hydroxyl group contained in the butylene glycol, trimethylol propane mixture, extracting the reaction mixture with a member having a boiling point of less than 200° C. and selected from the group consisting of aliphatic hydrocarbons, alicyclic hydrocarbons and mixtures thereof at a temperature above the melting point of said reaction mixture, but low enough to avoid undesirable polymerization reactions, separating the solvent layer from the liquid product layer obtained in the extraction step and recovering a urethane polyisocyanate from said product layer.

(References on following page)

References Cited in the file of this patent

UNITED STATES PATENTS

| | | |
|---|---|---|
| 2,683,728 | Mastin et al. | July 13, 1954 |
| 2,703,810 | Viard | Mar. 8, 1955 |

FOREIGN PATENTS

| | | |
|---|---|---|
| 742,501 | Great Britain | Dec. 30, 1955 |

OTHER REFERENCES

De Bell et al.: "German Plastics Practice," pages 303–304, De Bell and Richardson Publishers, Springfield, Mass. (1946).

Monsanto Technical Bulletin No. P-125, "Isocyanates," only pages 1 and 2 relied upon, October 1, 1951, Monsanto Chemical Co., Phosphate Division, St. Louis 4, Mo.

UNITED STATES PATENT OFFICE
CERTIFICATION OF CORRECTION

Patent No. 2,969,386　　　　　　　　　　　January 24, 1961

Wilbur R. McElroy

It is hereby certified that error appears in the above numbered patent requiring correction and that the said Letters Patent should read as corrected below.

Column 3, line 34, for "isoluble" read -- insoluble --; column 4, line 45, for "hydrocabon" read -- hydrocarbon --; column 5, line 24, for "thes" read -- the --; column 7, line 3, for "porduct" read -- product --; column 8, lines 39 and 40, for "diisocyanates" read -- polyisocyanates --.

Signed and sealed this 15th day of August 1961.

(SEAL)
Attest:

ERNEST W. SWIDER
Attesting Officer

DAVID L. LADD
Commissioner of Patents